United States Patent Office.

HENRY EDWARD FRANCIS DE BRIOU, OF LONDON, ENGLAND.

Letters Patent No. 67,783, dated August 13, 1867; patented in England, February 8, 1866.

IMPROVED COMPOUNDS FOR COATING IRON, WOOD, AND OTHER MATERIALS.

The Schedule referred to in these Letters Patent and making part of the same.

TO ALL TO WHOM THESE PRESENTS SHALL COME:

Be it known that I, HENRY EDWARD FRANCIS DE BRIOU, Doctor of Medicine, of St. George's Lodge, 19 Marlborough Hill, St. John's Wood, in the county of Middlesex, England, a subject of the Emperor of the French, have invented or discovered new and useful "Improved Compositions for Preserving Metals from Oxidation, Corrosion, and Galvanic Action, for protecting metals used in the construction of ships against the destructive effects of sea-water, and preventing their fouling; for protecting wood from the attacks of animalculæ, and preserving wood from damp, rot, and decay; for excluding damp from walls, and for use in submarine and other telegraphy;" and I, the said HENRY EDWARD FRANCIS DE BRIOU, do hereby declare the nature of the said invention, and in what manner the same is to be performed, to be particularly described and ascertained in and by the following statement thereof; that is to say—

This invention has for its object improved compositions for preserving metals from oxidation, corrosion, and galvanic action; for protecting metals used in the construction of ships against the destructive effects of sea-water, and preventing their fouling; for protecting wood from the attacks of animalculæ, and preserving wood from damp, rot, and decay; for excluding damp from walls, and for use in submarine and other telegraphy.

I take a composition made by taking vulcanized India rubber, (say three parts,) and melting it by heat in a cauldron, then adding mineral pitch, (say one part,) and melting it with the India rubber; (this composition, however, in itself, forms no part of my present invention;) or the composition may be made in accordance with a part of my present invention by the substitution of vegetable pitch or resin for mineral pitch, and I render the composition fluid or semi-fluid by compounding it with bisulphide of carbon. In preparing such a composition I prefer to proceed as follows: take, say, sixty-six pounds of vulcanized India rubber, and cut it into small pieces; then I place it in a large open kettle, by preference of copper, and heat it by a fire underneath. The contents of the kettle are constantly stirred until all the India rubber is reduced to a liquid state, and care is constantly taken not to apply more heat than is necessary; this will be about 500° Fahrenheit. I then add twenty pounds of vegetable pitch or asphaltum, (the former by preference,) and continue the heat and the stirring until it is melted and thoroughly mixed. Afterwards I add ten pounds of shellac and ten pounds of common rosin, and in a similar manner incorporate these with the other ingredients. These operations will require usually from three to six hours, according to the quantity operated on. The contents of the kettle should be carefully stirred the whole time; then the fire is withdrawn and the composition is poured or ladled out into wooden or metal vessels to cool and harden. Vulcanized India rubber, decomposed by heat, may be compounded with vegetable or mineral pitch or resin in other proportions, but the composition above described is that which I prefer. The composition thus prepared I render fluid, so that it can be used without the aid of heat, by means of bisulphide of carbon. I place it in closely-stopped vessels together with bisulphide of carbon, in the proportion conveniently of five pounds of composition to two and a half pounds of bisulphide of carbon. The vessels should be shaken and turned about daily for eight or ten days, by which time the composition will be completely dissolved, and fit for use as a paint and otherwise. To spread the paint over the surfaces to be protected I use common painters' brushes. The paint, which is kept ready for use in large tin jars, hermetically closed, is poured out into paint-pots, such as are used by painters, in small quantities at a time, and spread at once to prevent the evaporation of the bisulphide of carbon and the consequent thickening of the paints. Two coats are necessary for ships' bottoms and other submerged substances, and when it is used for ships' bottoms poisonous compounds are incorporated with the outer coating, as hereinafter specified. For objects exposed to atmospheric influences the paint should be used more liquid. It is thinned by the addition of a proportion of bisulphide of carbon, which varies according to the degree of consistence required in the paint. For delicate artistic iron-work or castings in metals and alloys the paint must be very thin. A single coat is sufficient, but a varnish should be spread over it. Upon submerged wood the paint is applied of the same consistence and prepared in the same manner as for ships' bottoms. For timber left exposed to the air, or employed for building purposes or upon railways, the paint ought to be thinner, in order better to penetrate the pores of the wood; one coat is sufficient. For submerged wood two coats are used. Brick or stone-walls can be covered on one or both sides, one or two coats of the paint being employed. Felt used under the copper sheathing of ships, for roofing and other purposes, is rendered perfectly water-tight by being dipped into the fluid composition and made to pass between two cylinders. Woollen, cotton, silk, or other stuffs, linen, canvas, bands of every material can be rendered water-proof by being coated with the liquid composition. Wrapping-paper, card-board, and other kinds of paper are made water-proof by spreading a thin coat of the paint between two sheets, and passing them between hot cylinders. As regards its employ in submarine and aerial telegraphy, I use it in submarine cables to form the core which surrounds the conducting wires. I pass the core through semi-fluid cold paint or composition, and then through a die to equalize the coating. I also saturate with the paint in a very liquid condition the inner covering of the core, whether made of hemp or other fibrous material, and the outer covering when a hempen one is used, and I employ it as a paint for the outer covering when this is made of iron wires instead of hemp. In aerial telegraphy I use it as a liquid paint for saturating narrow bands woven with hemp or other fibrous material, and I wind them round the conductors in order to effect insulation and to protect the wires.

When it is desired that the composition shall resist the attacks of marine animals I compound it with poisonous materials, which I prepare as follows: I take a substance formed by the decomposition of concentrated hydrocyanic acid in dry chlorine, (a kind of chloride of cyanogen,) to which I add the cyanide of mercury and the ferrocyanide of copper, in equal proportions, thus forming a compound which readily mixes with the vulcanized India-rubber composition. The proportions are: hydrocyanic acid and chlorine, (chloride of cyanogen,) one ounce; chlorocyanide of mercury, two ounces; ferrocyanide of copper, two ounces; vulcanized India-rubber composition, ten pounds. These ingredients are to be well stirred together. This preparation is principally used for copper, zinc, the brasses, and alloys. For iron I sometimes replace the cyanide of mercury by Prussian blue, in the proportion of three ounces for five pounds of vulcanized India-rubber composition.

For submerged wood, copper, zinc, or iron, I mix together arsenite of copper, five ounces; bicyanide of mercury, two ounces; vulcanized India-rubber composition, ten pounds.

I would have it understood that I do not confine myself to the exact proportions above stated, as these may be varied; but what I claim is the preparing compositions by compounding vulcanized India rubber, rendered liquid by heat, with vegetable pitch and resin, (either together or separately,) substantially as above described.

I also claim the combinining bisulphide of carbon with compositions such as the above, or similar preparations made with mineral pitch, so as to obtain a paint-like composition, which can be applied without the aid of heat, substantially as herein described.

I also claim the combining with such paint-like compositions the poisonous ingredients hereinbefore specified, substantially as herein described.

H. E. F. DE BRIOU.

Witnesses:
G. F. WARREN,
JOHN DEAN,
} Both of No. 17 Gracechurch Street, London, E. C.